Dec. 6, 1932.                    J. F. BLACK                    1,890,174
                                 FOREHEARTH
                             Filed July 2, 1930           2 Sheets-Sheet 1

Witness:
Jas. G. White

Inventor
Jotham F. Black
By Brown & Parham
Attorneys

Patented Dec. 6, 1932

1,890,174

UNITED STATES PATENT OFFICE

JOTHAM F. BLACK, OF BUTLER, PENNSYLVANIA, ASSIGNOR TO HARTFORD-EMPIRE COMPANY, OF HARTFORD, CONNECTICUT, A CORPORATION OF DELAWARE

FOREHEARTH

Application filed July 2, 1930. Serial No. 465,265.

This invention relates to improvements in forehearths for conducting molten glass from a melting tank or other source of supply to a place at which glass may be fed through a submerged outlet in mold charges, gathered in suction gathering receptacles drawn, or otherwise removed.

An object of the invention is to provide a forehearth having improved means for effecting circulation of glass therein so as to assure homogeneity of the glass at the delivery point and so as to permit regulation and control of the temperature and level of the glass at the delivery point independently of variations of temperature and head of glass in the supply tank or source of supply.

A further object of the invention is to provide a forehearth having means for effecting drainage of glass from the delivery portion of the forehearth quickly and completely, when desired, so that access to such delivery portion of the forehearth or to parts associated therewith may be had without wastage of glass.

A still further object of the invention is to provide for regulable control of the transfer of molten glass between a supply tank or source of supply and a place in the forehearth at which glass is to be fed or otherwise removed or delivered, and for the regulable control of the temperature and condition of the glass at such place of removal or delivery.

Other objects and advantages of the invention will be apparent from the description hereinafter given when such description is considered in conjunction with the accompanying drawings, in which.

Figure 1:
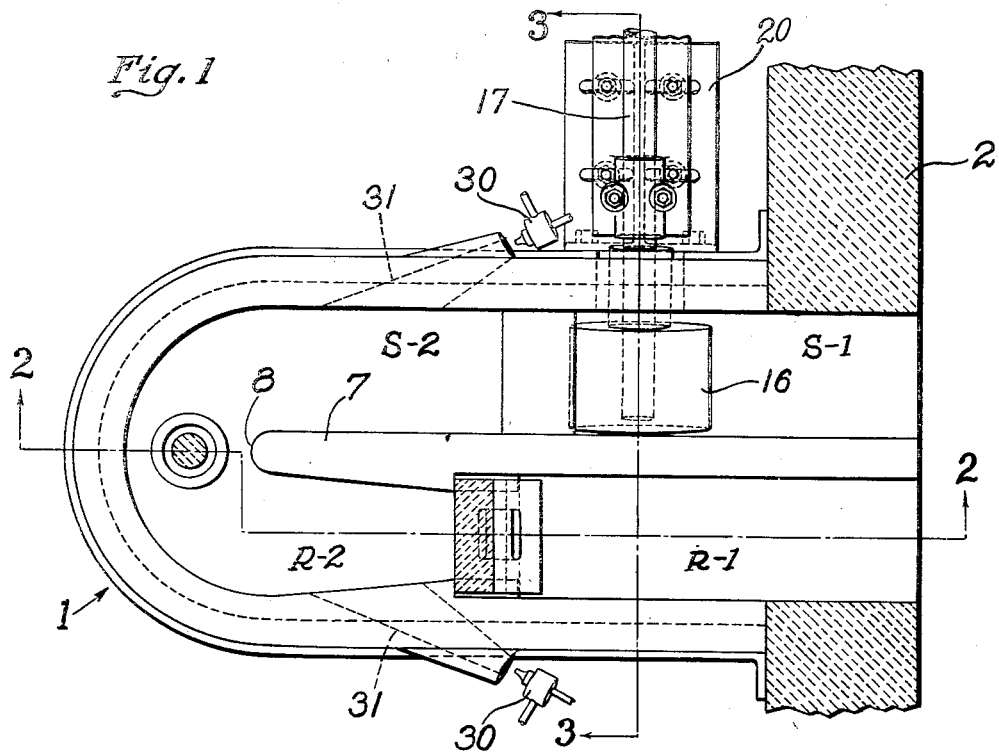
Figure 1 is a horizontal sectional view of the improved forehearth structure applied to a wall of a melting tank, the view having been taken substantially along the line 1—1 of Fig. 2.

In carrying out the invention, a forehearth structure is arranged to project from a wall of the melting tank so that the interior of the forehearth is in communication through on opening in the wall of the tank with the interior of the tank both above and below the level of the glass in the latter. The outer end portion of the forehearth structure is formed to permit glass to be fed or otherwise removed therefrom. Molten glass from the tank is supplied to this delivery portion of the forehearth through a supply channel in such manner that the temperature and the amount of glass thus supplied from the tank to the delivery portion of the forehearth may be regulated and controlled independently of variations of temperature and head of glass in the supply tank. Also, provision is made for conducting the glass that is not fed or otherwise removed from the delivery portion of the forehearth back through a separate channel into the tank for reheating and assimilation by the glass therein. This return of glass from the delivery portion of the forehearth may be effected at a rate that is regulable so as to control the head of glass at the place of delivery in the forehearth and also in such manner that all the glass may be permitted to drain from the delivery portion of the forehearth, when desired, thereby permitting access to the delivery portion of the forehearth and to the parts adjacent thereto without wastage of glass.

Referring now to the drawings, a practical embodiment of the structural features of the invention is shown as comprising a forehearth structure generally indicated at 1. This forehearth structure may comprise suitable refractory top, bottom and side walls, suitably supported so that the rear end of the forehearth is connected with a wall 2 of a melting tank (not shown) as required to permit molten glass to pass through an opening 3 in such tank wall between the interior of the tank and the space in the rear or inner end of the forehearth structure. Certain or all of the refractory walls of the forehearth may be insulated in any suitable known manner and the means for supporting the forehearth and for connecting it with the melting tank likewise may be of any suitable known construction.

In the embodiment of the invention illustrated in the drawings, the outer end or delivery portion of the forehearth constitutes a feed chamber, indicated at 4, having a discharge outlet 5 in its bottom through which glass may be fed under the control of a refractory implement 6. The latter may be adjusted and/or reciprocated vertically by suitable means, such as are now well known in the art for any useful purpose, as to aid in controlling the formation below the outlet of mold charges suitable to be fabricated into articles of glassware.

The space within the forehearth is divided longitudinally by a refractory partition wall 7 which may extend from the inner end of the outlet opening 3 in the tank wall to the delivery portion 4 of the forehearth. This longitudinally extending partition wall 7 preferably is disposed midway between the side walls of the forehearth structure and cooperates with such side walls and with the bottom of the forehearth to provide a glass supply channel and a glass return channel. The glass supply channel comprises an inner end portion S—1 and an outer end portion S—2. The return channel likewise comprises an inner end portion R—1 and an outer end portion R—2. The outer end portions S—2 and R—2 of the supply and return channels, respectively, are in open communication at their outer ends with the delivery portion 4 of the forehearth. The arrangement preferably is such that the supply channel, the delivery portion of the forehearth, and the return channel jointly form a substantially U-shaped passage, the bend portion of which comprises the delivery portion of the forehearth while the legs thereof comprise the supply and return channels. Both ends of this substantially U-shaped passage thus are in communication with the interior of the melting tank below the level of glass in the latter.

In order to facilitate movement of glass from the outer end portion S—2 of the supply channel through the delivery portion 4 of the forehearth channel and thence back into the outer end portion of the return channel, the inner wall of the outer end portion of the forehearth preferably is curved arcuately, as clearly shown in Fig. 1, while the outer end of the partition wall 7 likewise is curved arcuately in horizontal sectional configuration, as indicated at 8 in Fig. 1. Also, the discharge outlet 5 in the bottom of the delivery portion of the forehearth preferably is located at the approximate center of the latter and in the plane of the coincident longitudinal median lines of both the partition 7 and the space within the forehearth structure.

Figure 3:
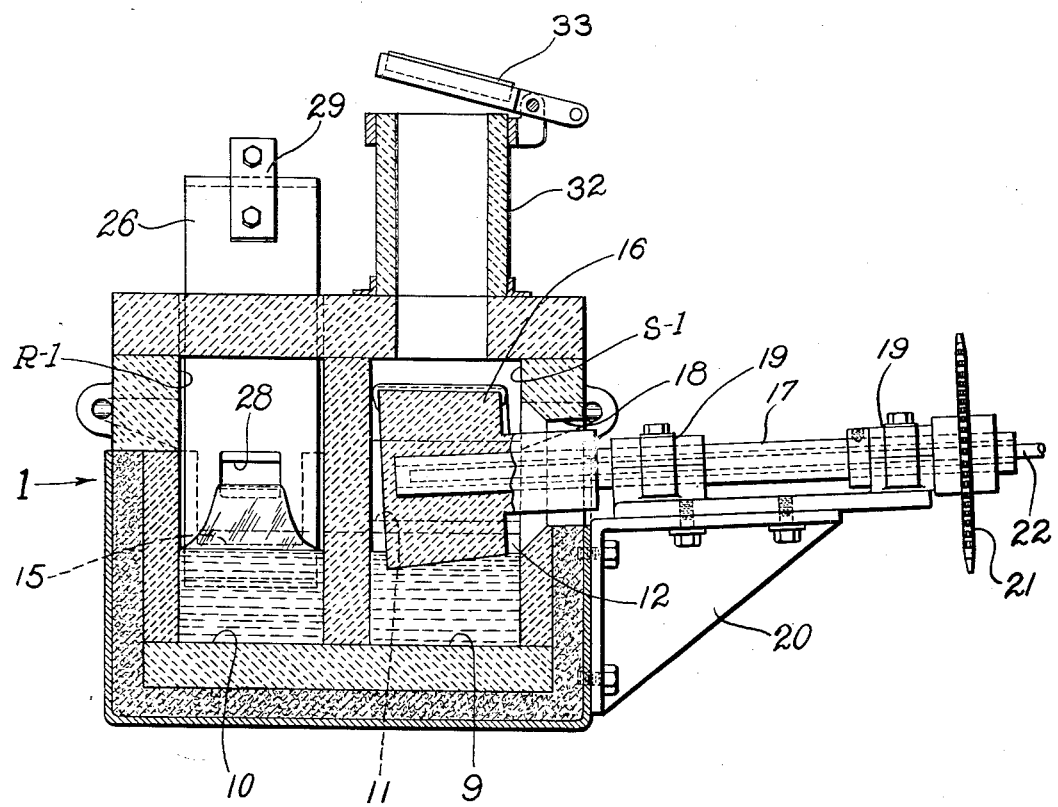
Fig. 3 is a transverse vertical section through the forehearth, the view having been taken substantially along the line 3—3 of Fig. 1.

The bottom walls of the rear end portions S—1 and R—1 of the supply and return channels of the forehearth are indicated at 9 and 10, respectively, in Fig. 3. These bottom walls 9 and 10 may be level with each other and with the bottom of the opening 3 in the tank wall 2 so that the level of glass in the rear end portions of the supply and return channels of the forehearth may coincide approximately with the level of the glass in the melting tank.

Figure 2:
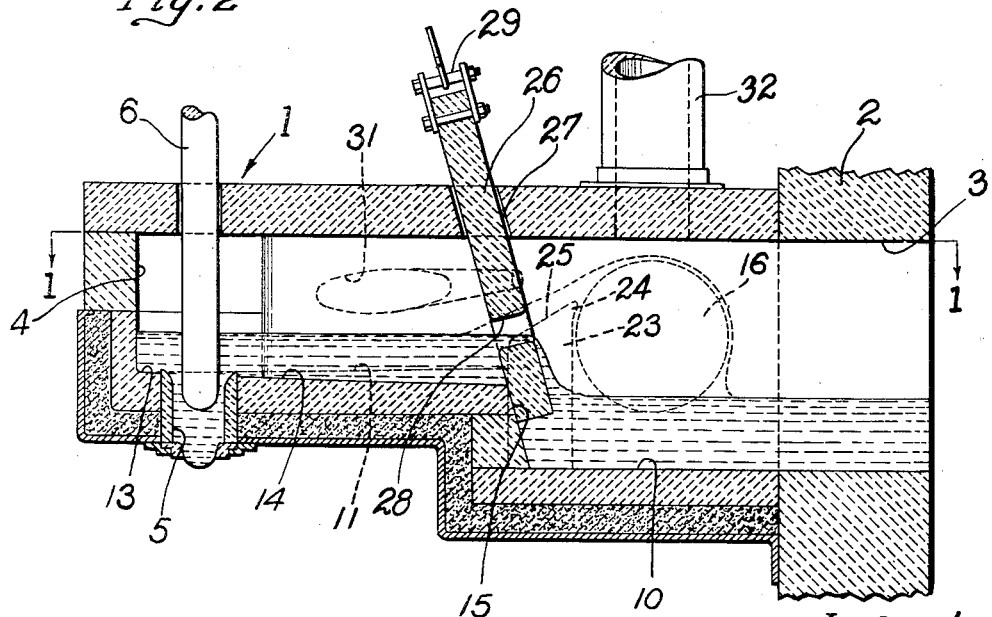
Fig. 2 is a longitudinal vertical section through the improved forehearth and through a portion of the wall of the melting tank, the view having been taken substantially along the line 2—2 of Fig. 1.

The bottom walls of the forward portions of the supply and return channels and of the delivery portion of the forehearth are located at higher levels than the rearward portions of the supply and return channels and are so formed as to permit desirable regulation and control of the supply of glass from the rear end portion of the supply channel along the forward end portion of the latter to the delivery portion of the forehearth and then the return of the unused glass along the forward end portion of the return channel into the rearward end portion of the latter and thence back to the melting tank. As best seen in Figs. 2 and 3, the rear end of the bottom wall 11 of the forward end portion of the supply channel is located considerably above the level of the glass in the rear end portion of the supply channel and in the melting tank, a transversely extending vertical wall or shoulder 12 being provided at the junctures of the forward and rear end portions of the supply channel and being of sufficient height to prevent gravity flow of glass from the melting tank into the forward end portion of the supply channel. The bottom wall 11 of the forward end portions S—2 of the supply channel slopes gradually to the level of the floor or bottom wall 13 of the delivery portion of the forehearth. The bottom wall 13 of the delivery portion of the forehearth likewise is shown as being above the level of the glass in the rear end portion of the supply and return channels and in the melting tank. The bottom wall 14 of the forward end R—2 of the return channel slopes rearwardly from the level of the bottom 13 of the delivery portion of the channel and is connected at its rearward end by a forwardly inclined abrupt wall 15 with the bottom wall 10 of the rear portion R—2 of the return channel, the rear end of the bottom wall 14 preferably being slightly above the level of the glass in the rear end portions of the supply and return channels and in the melting tank. With this arrangement, it is obvious that glass cannot pass by gravity into the forward end portion of the supply channel but that when glass is delivered into the latter, such glass will tend to flow into the delivery portion 4 of the forehearth and thence rearwardly along the forward portion of the return channel into the rear portion of the latter.

The invention provides means for impelling or transferring glass from the rearward end portion of the supply channel into the forward end portion of such channel, when desired, at a rate which may be predetermined according to particular service requirements. The particular means shown in the drawings for this purpose comprises a rotary impeller 16 which is disposed in the rear end portion of the supply channel and is adapted by its rotation to lift glass from the rear portion of the supply channel and to deliver such glass into the forward end portion of that channel. The impeller 16 is shown as a frusto-conical refractory member dipping into the glass in the rear end portion of the supply channel and rotating about an axis extending in a direction generally transverse of the forehearth but inclined slightly from the horizontal so that a plane tangent to the uppermost portion of the impeller will be horizontal. The frusto-conical impeller 16 is disposed in the supply channel so that the larger end thereof is next to the partition member 7, or in other words at the inner side of the channel, where the glass may be hotter than at the outer side of such channel. The dip of the impeller into the glass may vary along the impeller in accordance with variation of peripheral speed longitudinally of such impeller, whereby the glass lifted by the impeller as the latter rotates may be uniform in thickness longitudinally of the impeller, as shown in Fig. 3.

The refractory impeller 16 is shown as being supported on a rotary stem or shaft 17. The shaft passes through a suitable opening 18 in the adjacent side wall of the forehearth structure and is journaled in bearings 19, supported on a bracket 20. The bracket 20 may be attached to the supporting frame structure for the forehearth or in any other suitable known manner.

The shaft 17 and the impeller 16 are rotated by any suitable known means in the direction required to transfer glass from the rear end portion of the supply channel to the forward end portion of that channel. In Fig. 3 a sprocket wheel 21 is shown, attached to the shaft 17, and deriving power from any convenient source, not shown, for rotating the shaft and the impeller.

The shaft 17 may be cooled in any suitable known manner, as by circulating a cooling fluid therethrough, as from the tube 22.

In order to aid the transfer of glass by the rotary impeller from the rear end portion of the supply channel to the forward end portion of the latter, a transverse combined scraper and glass guiding member 23 may be provided in the forehearth between the forward portion of the periphery of the impeller and the shoulder 12 at the rear end of the forward end portion of the supply channel. The member 23 extends above the shoulder 12 and has its upper end portion formed to provide a scraper lip 24 near the periphery of the impeller 16 above the axis of rotation of the latter. The upper surface of the member 23 is formed to slope downwardly and forwardly, as indicated at 25, from the lip 24. With this arrangement, the glass that is lifted by the impeller on rotation of the latter will on striking the lip 24 be stripped from the periphery of the impeller and conducted downwardly and forwardly in a stream onto the bottom of the forward end portion of the supply channel S—2. Such glass then will flow in a stream into the delivery end portion of the forehearth and will submerge the outlet in the bottom of the latter.

In order to regulably control the head of glass over the submerged outlet in the bottom of the delivery portion of the forehearth and to aid in regulating both the temperature of the glass in the delivery portion of the forehearth and the rate of circulation or movement of glass therethrough, the invention provides a valve for regulably controlling the rate of passage of glass from the forward end portion of the return channel into the rearward end portion of such channel. This valve is shown in the drawings as comprising a transversely disposed refractory member 26, extending slidably through an opening 27 in the top wall of the forehearth structure and having its lower end portion disposed flatwise against and in sliding contact with the inclined shoulder 15 at the juncture between the adjacent ends of the forward and rear portions of the return channel. An opening 28 is provided through the refractory valve member 26 to permit more or less glass to pass from the forward end portion of the return channel into the rearward end portion of such channel and then back into the tank. The valve member 26 may be raised until the opening 28 is disposed entirely above the level in the glass in the forward end portion of the return channel, thereby preventing return of any glass to the tank until the level of glass in the delivery portion of the forehearth has been raised above the bottom of the valve opening 28. Also, the valve member 26 may be adjusted to permit all the glass to drain from the delivery portion of the forehearth back into the rear end portion of the return channel and thence into the melting tank, assuming of course that the glass transferring movements of the impeller have been discontinued. Access to the forward end portion of the forehearth thus would be permitted without wastage of glass.

The valve 26 is shown as being provided at its top with a connection 29 for connecting it with any suitable adjusting means. No means for adjusting the valve 26 up and down are shown as suitable means are well known in the art.

By adjusting the valve 26 vertically in the manner described, the head of glass over the discharge outlet 5 and the temperature of such glass may be regulated and controlled independently of any means for controlling the temperature of the glass in the delivery portion of the forehearth by local cooling or heating of such glass. It may be desirable, however, to apply heat locally to the glass within the forehearth and the invention therefore may provide burners, such as indicated at 30, Fig. 1, for projecting flame through the burner openings 31 in the side walls of the forehearth forwardly and inwardly above the glass in the forward portions of the supply and return channels and toward and above the glass in the delivery portion of the forehearth. Also, the forehearth preferably is provided with a vent for heated gases, such as a stack 32 which preferably is located in communication with the space above the rearward portion of the supply channel. Such vent or stack is suitably controlled, as by means of the damper shown at 33 in Fig. 3, whereby the draft and temperature conditions within the forehearth may be further regulated and controlled.

Instead of burners, any other suitable means may be employed to apply temperature regulating media to the glass in the forehearth.

While the practical embodiment of the invention shown in the drawings and herein described in detail has the delivery portion of the forehearth formed to provide for the feeding of glass through a bottom discharge outlet, it is to be understood that such delivery portion of the forehearth may be suitably formed to permit glass to be gathered therefrom by suction gathering receptacles in a manner well known in the art or to be removed from the delivery portion of the forehearth by any other suitable known means and in any other suitable known manner. In each instance, the control of temperature, heat, and flow of glass to and from the delivery portion of the forehearth, as hereinbefore described, will permit desirable regulation and control of the temperature of the glass at the point of removal or delivery and also will assure desirable homogeneity of such glass, the circulation of which may be continuous up to the point and time of removal thereof from the forehearth.

The features of the invention may be modified and altered in many respects to meet the requirements of various conditions and for various uses without departing from the spirit and scope of the invention.

I claim:

1. A forehearth for molten glass comprising a structure appurtenant to a melting tank and having a continuous passage, the ends of said passage communicating with the interior of the tank below the level of the glass in the latter, an intermediate portion of said passage being adapted to permit glass to be fed or otherwise removed therefrom, means between one end of said passage and said place of removal of glass for preventing gravity flow from the tank to said place of removal, means for transferring molten glass from said end of the passage past said gravity flow preventing means toward said place of removal of glass, said passage being formed between said place of removal of glass therefrom and the other end of the passage to cause gravity flow of glass from said place of removal back toward the tank, and means for regulating the rate of said return gravity flow of the glass.

2. A forehearth comprising a structure having a continuous passage therein, the ends of said passage communicating with the interior of a melting tank to permit the flow of glass between such ends of the passage and the interior of the tank, an intermediate portion of said passage having its bottom located above the level of the glass in the ends of said passage and constituting a glass delivery chamber, a flow obstructing barrier in said passage between said delivery chamber and one end of the passage, and means for impelling glass from said one end of the passage over said barrier.

3. The combination with a melting tank or like source of supply of molten glass, of a forehearth projecting therefrom and having its inner end in glass exchanging communication with the source of supply, said forehearth having a delivery chamber spaced from the source of supply, means for circulating molten glass from said source of supply through said delivery chamber and back toward the source of supply, and means for regulating the rate of said circulatory movement of glass in the forehearth independently of the action thereon of pressure from the source of supply.

4. The combination with a melting tank or like source of supply of molten glass, of a forehearth projecting therefrom and having its inner end in glass exchanging communication with the source of supply, said forehearth having a delivery chamber spaced from the source of supply, means for circulating molten glass from said source of supply through said delivery chamber and back toward the source of supply, and means for regulating the depth of glass in the delivery chamber independently of variations of level of glass in the source of supply.

5. The combination with a melting tank, of a forehearth projecting therefrom and having its inner end in glass exchanging relation with the interior of the tank, said forehearth having a delivery chamber adjacent to its outer end, the bottom of said delivery chamber being located at a level higher than that of the glass in the inner end of the forehearth, means providing an inclined surface sloping from the inner end of the forehearth to the bottom of said delivery chamber, means providing an inclined surface sloping from the bottom of the delivery chamber toward the inner end of the forehearth, means for transferring molten glass from the inner end of the forehearth onto said first named sloping surface, and means for regulating the rate of return flow of molten glass from said second named sloping surface.

6. The combination with a melting tank, of a forehearth projecting therefrom and having its inner end in glass exchanging communication with the interior of the tank, said forehearth having a delivery chamber adjacent to its outer end, a glass supply channel extending from the inner end of the forehearth to said delivery chamber, a glass return channel extending from said delivery chamber to the inner end of the forehearth, means for preventing gravity flow of glass from the inner end of the forehearth along said supply channel to said delivery chamber, means for impelling molten glass from the inner end of the forehearth along said supply channel to the delivery chamber to cause a circulatory movement of glass through said delivery chamber into the return channel, and means for regulating the rate of return flow of glass from the delivery chamber along said return channel.

7. The combination with a melting tank for molten glass, of a forehearth projecting therefrom and having its inner end in glass exchanging communication with the interior of the tank, said forehearth having a delivery chamber adjacent to its outer end, a supply channel extending from the inner end of the forehearth to said delivery chamber, and a glass return channel extending from said delivery chamber toward the inner end of the forehearth, a barrier in said supply channel for intercepting gravity flow of glass from the inner end of the forehearth, an impeller for lifting molten glass from the inner end of said forehearth over said barrier, means preventing flow of glass from the inner end of said forehearth outwardly along said return flow channel, and means for regulably controlling the return of the molten glass from said return channel to the inner end of said forehearth.

8. The combination with a melting tank, of a forehearth projecting therefrom and having its inner end in glass exchanging communication with the interior of the tank, a delivery chamber adjacent to the outer end of the forehearth, a vertical partition extending longitudinally of the forehearth intermediate its width from the inner end of the forehearth to said delivery chamber, providing glass supply and return channels between the delivery chamber and the inner end of the forehearth, said delivery chamber having a bottom wall located above the level of the glass in the inner end of the forehearth, the supply channel having a bottom wall sloping to the bottom of said delivery chamber from a level above that of the glass in the inner end portion of the forehearth, the return channel having a bottom wall sloping from the bottom of the delivery chamber rearwardly to a level above that of the glass in the inner end portion of the forehearth, a rotary impeller for lifting glass from the inner end portion of the forehearth onto the floor of the sloping bottom of the supply channel, and a valve at the rear end of the return channel for regulating the rate of return of molten glass from the return channel to the inner end portion of the forehearth.

9. The combination with a melting tank, of a forehearth projecting therefrom and having its inner end in glass exchanging communication with the interior of the tank, a delivery chamber adjacent to the outer end of the forehearth, a vertical partition extending longitudinally of the forehearth intermediate its width from the inner end of the forehearth to said delivery chamber, providing supply and return channels between the delivery chamber and the inner end of the forehearth, said delivery chamber having a bottom wall located above the level of the glass in the inner end of the forehearth, the supply channel having a bottom wall sloping to the bottom of said delivery chamber from a level above that of the glass in the inner end portion of the forehearth, the return channel having a bottom wall sloping from the bottom of the delivery chamber rearwardly to a level above that of the glass in the inner end portion of the forehearth, a rotary impeller for lifting glass from the inner end portion of the forehearth onto the floor of the sloping bottom of the supply channel, a vertically adjustable valve at the rear end of the return channel for regulating the rate of return of molten glass from the return channel to the inner end portion of the forehearth, said delivery chamber having a bottom discharge outlet, and means for regulating discharge through said outlet.

10. The combination with a melting tank, of a forehearth projecting therefrom and having its inner end in glass exchanging communication with the interior of the tank, a delivery chamber adjacent to the outer end of the forehearth, a vertical partition extending longitudinally of the forehearth intermediate its width from the inner end of the forehearth to said delivery chamber, thus providing supply and return channels between the delivery chamber and the inner end of the forehearth, said delivery chamber having a bottom wall located above the level of the glass in the inner end of the forehearth, the supply channel having a bottom wall sloping to the bottom of said delivery chamber from a level above that of the glass in the inner end portion of the forehearth, the return channel having a bottom wall sloping from the bottom of the delivery chamber rearwardly to a level above that of the glass in the inner end portion of the forehearth, a rotary impeller for lifting glass from the inner end portion of the forehearth onto the floor of the sloping bottom of the supply channel, a valve at the rear end of the return channel for regulating the rate of return of molten glass from the return channel to the inner end portion of the forehearth, said delivery chamber having a bottom discharge outlet, means for applying heat locally to the space above the glass in said channels and said delivery chamber, and a regulably controllable vent communicating with the space above the glass in the inner end portion of the forehearth at the same side of said longitudinal partition as said supply channel.

11. A combination with a melting tank, of a forehearth projecting therefrom and having its inner end in glass exchanging communication with the interior of the tank, said forehearth having a delivery chamber adjacent to its outer end and having a supply channel and a return channel extending from the inner end of the forehearth to said delivery chamber, the bottom of said delivery chamber being located at a level higher than the inner end portion of the forehearth, said supply channel having a bottom wall sloping from the inner end portion of the forehearth forwardly to the level of the bottom of the delivery chamber, said return channel having a bottom wall sloping rearwardly from the bottom of the delivery chamber toward the delivery end of the forehearth, thereby providing shoulders in said channels adjacent to the inner end of the forehearth, a combined glass guiding and scraper member disposed at the shoulder of said supply channel and projecting above the level of the glass therein, the upper surface of said member sloping forwardly and said member having an upwardly and rearwardly projecting lip, a rotary impeller dipping into the glass adjacent to and at the rear of said combined glass guiding and scraping member and cooperating with the latter to deliver glass into the said supply channel and a vertically adjustable valve having a portion in sliding contact with the shoulder of said return channel for regulating the rate of return of glass from the latter.

12. The combination with a melting tank, of a forehearth projecting therefrom and having its inner end in glass exchanging communication with the interior of the tank, said forehearth having a delivery chamber adjacent to its outer end and having glass supply and return channels respectively for supplying glass to the delivery chamber and for returning unused glass from the delivery chamber to the inner end of the forehearth, a rotary impeller for positively impelling glass along said supply channel, said rotary impeller being mounted to turn about an axis inclined slightly from the horizontal, the glass engaging portion of said impeller being substantially frusto-conical and being located in position to cause the larger end thereof to be dipped into the glass in the supply channel adjacent to the inner side of the latter.

13. The combination with a melting tank, of a forehearth projecting therefrom and having its inner end in glass exchanging communication with the interior of the tank, said forehearth having a delivery chamber adjacent to its outer end having glass supply and return channels respectively for supplying glass to the delivery chamber and for returning unused glass from the delivery chamber to the inner end of the forehearth, a rotary impeller for positively impelling glass along said supply channel, said rotary impeller being mounted to turn about an axis inclined slightly from the horizontal, the glass engaging portion of said impeller being substantially frusto-conical and being located in position to cause the larger end thereof to be dipped into the glass in the supply channel adjacent to the inner side of the latter, the inclination of the axis of rotation of said impeller and the shape of the frusto-conical glass engaging portion thereof being so related that a stream of glass of substantially uniform thickness throughout the length of the glass engaging portion of the impeller will be impelled forwardly in the supply channel.

14. The combination with a source of supply of molten glass of a delivery chamber adjacent to said source, means for preventing any flow of glass by gravity and head pressure from said source to said delivery chamber, means for transferring glass from said source to said chamber, and means for returning glass from said delivery chamber to said source of supply.

15. The combination with a source of supply of molten glass of a chamber adjacent to said source, means for delivering molten glass from said source to said chamber, and means for returning glass from said chamber to said source of supply, said means for delivering glass to the chamber and said glass returning means being adapted for cooperative use to effect cessation of delivery of glass from said source to said chamber and return of all unused molten glass from said chamber to said source.

16. The combination with a source of supply of molten glass of a flow channel having end portions adjacent to said source of supply, means for preventing flow of molten glass from said source of supply to either end of said channel, means for transferring molten glass from said source of supply to one end of said channel, and means for causing return of glass from the other end of said channel to said source of supply.

17. The combination with a source of supply of molten glass of a flow channel having end portions adjacent to said source of supply, means for preventing flow of molten glass from said source of supply to either end of said channel, means for transferring molten glass from said source of supply to one end of said channel, means for causing return of glass from the other end of said channel to said source of supply, and means for regulating the rate of said return of glass to said source.

18. The combination with a source of supply of molten glass of a container for molten glass adjacent to said source, said container having a portion from which glass may be fed or otherwise removed, said portion of the container being adapted to support the molten glass therein at a level above that of the glass of said source of supply, means for supplying molten glass from said source to said portion of the container, and means for returning to said source of supply unused glass from said portion of the container.

Signed at Hartford, Connecticut, this 1st day of July, 1930.

JOTHAM F. BLACK.